US012639793B2

(12) United States Patent (10) Patent No.: US 12,639,793 B2

O'Neil et al. (45) Date of Patent: May 26, 2026

(54) SYSTEM, DEVICES AND/OR PROCESSES FOR DYNAMIC TEMPORAL ANTI-ALIASING TECHNIQUE SELECTION

(71) Applicant: Arm Limited, Cambridge (GB)

(72) Inventors: Liam James O'Neil, Bedale (GB); Joshua James Sowerby, Twickenham (GB); Matthew James Wash, Stapleford (GB); Yanxiang Wang, Manchester (GB)

(73) Assignee: Arm Limited, Cambridge (GB)

( * ) Notice: Subject to any disclaimer, the term of this patent is extended or adjusted under 35 U.S.C. 154(b) by 297 days.

(21) Appl. No.: 17/681,319

(22) Filed: Feb. 25, 2022

(65) Prior Publication Data

US 2023/0274394 A1 Aug. 31, 2023

(51) Int. Cl.
*G06T 5/70* (2024.01)
*G06T 1/60* (2006.01)
*G06T 5/20* (2006.01)

(52) U.S. Cl.
CPC .................. *G06T 5/70* (2024.01); *G06T 1/60* (2013.01); *G06T 5/20* (2013.01)

(58) Field of Classification Search
CPC ............. G06T 1/60; G06T 2207/10016; G06T 2207/20021; G06T 2207/20182; G06T 2207/20192; G06T 2207/20221; G06T 5/20; G06T 5/50; G06T 5/70
See application file for complete search history.

(56) References Cited

U.S. PATENT DOCUMENTS 11,431,955 B1 * 8/2022 Ning .......................... G06T 5/50

OTHER PUBLICATIONS

Jiang et al, "Image anti-aliasing techniques for Internet visual media processing: a review*", 2014 (Year: 2014).*
Nahab et al, "Accelerating Real-Time Shading with Reverse Reprojection Caching", GH, 2007 (Year: 2007).*
Yang et al, "A Survey of Temporal Antialiasing Techniques", 2020 (Year: 2020).*
Yang, et al, "A Survey of Temporal Antialiasing Techniques," Eurographics 2020, vol. 39, No. 2, STAR—State of The Art Report, 15 pages.
Burnes, "Nvidia DLSS 2.0: A Big Leap In AI Rendering," Mar. 23, 2020, https://www.nvidia.com/en-gb/geforce/news/nvidia-dlss-2-0-a-big-leap-in-ai-rendering/, 17 pages.

* cited by examiner

*Primary Examiner* — Ruiping Li
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to select between and/or among multiple available alternative approaches to perform a temporal anti-aliasing operation in processing an image.

21 Claims, 3 Drawing Sheets

300

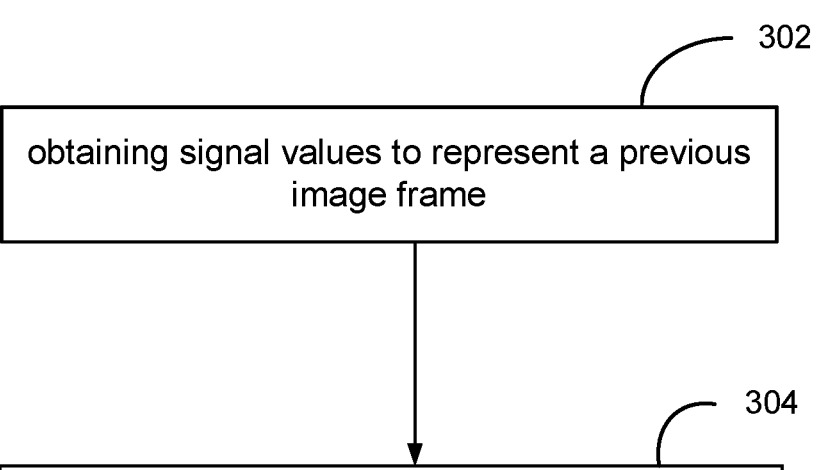

302 obtaining signal values to represent a previous image frame

304 selecting one of a plurality of available temporal antialiasing operations for application to signal values to represent a portion of an image in a current image frame based, at least in part, on a comparison of at least one computed attribute of the current image frame and at least one computed attribute of the previous image frame

*FIG. 2*

SYSTEM, DEVICES AND/OR PROCESSES FOR DYNAMIC TEMPORAL ANTI-ALIASING TECHNIQUE SELECTION

BACKGROUND

1. Field

Techniques, devices and processes for application of an anti-aliasing technique to a rendered image are described.

2. Information

Adaptation of computer-generated imagery to particular resolutions (e.g., to small resolutions on mobile gaming platforms) may introduce image aliasing, possibly giving rise to "jaggy" edges in rendered content. Temporal Anti-Aliasing (TAA) processes may be employed to mitigate such aliasing effects by, for example, setting pixel values of averages of sub-pixel samples. Such averages of sub-pixel samples may be determined based, at least in part, on temporal accumulation of such sub-pixel samples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 2 is a flow diagram of a process for selection of at least a portion of an anti-aliasing technique for application to an image according to an embodiment.

Figure 1:
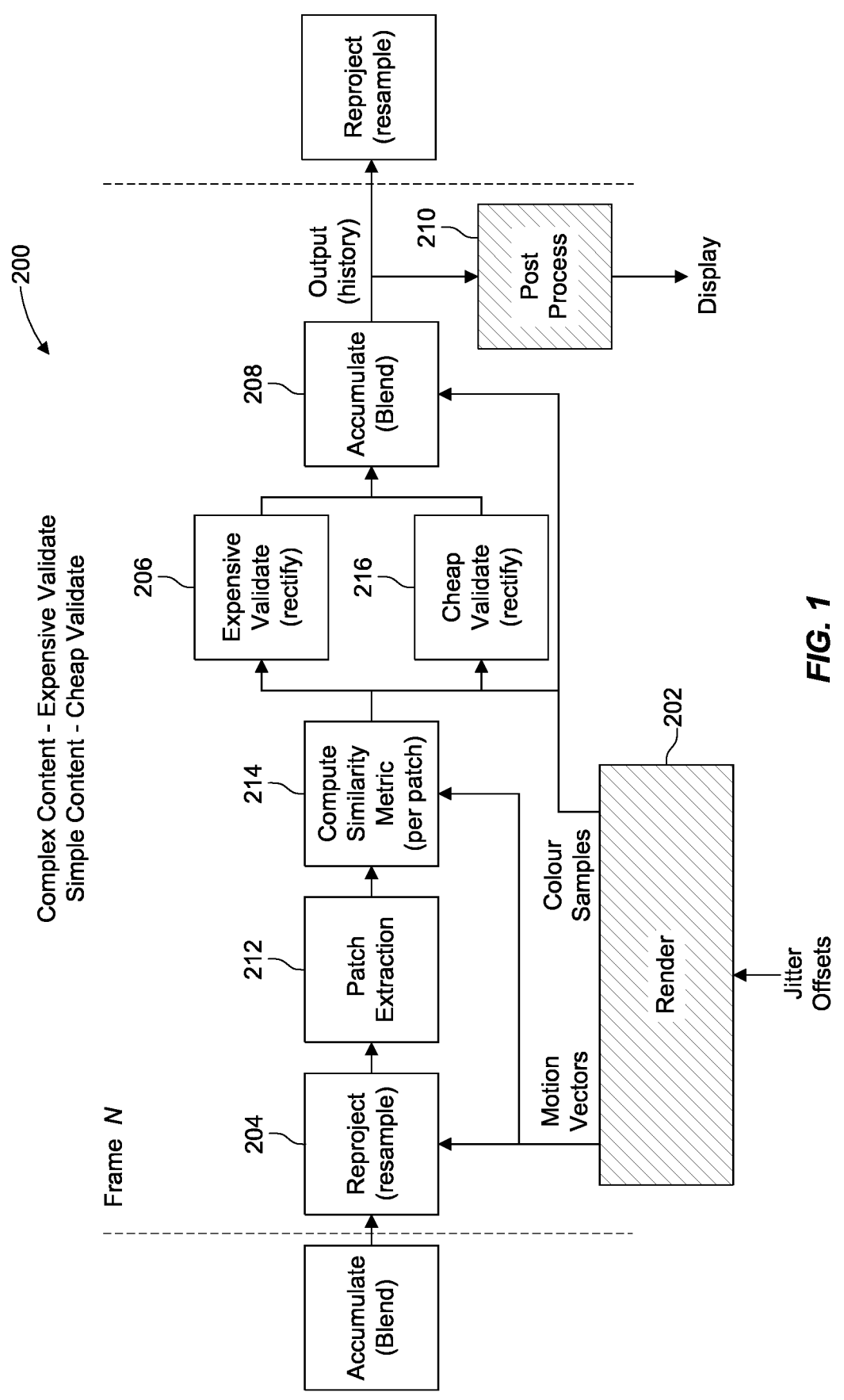
FIG. 1 is a schematic diagram of a system for processing image frames according to an alternative embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, Temporal Anti-Aliasing (TAA) techniques may involve processing of image signal intensity values collected over multiple frames. In an implementation, aliasing may occur if observations and/or samples of an image signal are not obtained at a sufficiently high resolution to avoid distortion and/or artifacts in a reproduced image. To evenly sample different locations within a pixel area, a sub-pixel jitter offset drawn from a sample sequence may be used to shift a viewport temporally on image frames. For example, a viewport sub-pixel jitter offset may be injected to a camera projection matrix to spatially vary different image signal intensity values in different frames. Temporally accumulated image signal intensity values from an output of a previous frame N–1 may be reprojected (e.g., resampled) based, at least in part, on application-generated motion vectors to account for camera and/or object motion. Due to changes in occlusion, lighting and/or surface content, for example, a fetched history of image signal intensity values (e.g., for a previous frame N–1) may be invalid and/or inconsistent with image signal intensity values in a current frame N. Application of such invalid image pixel values without scrutiny may introduce ghosting and/or image lag artifacts. In a particular implementation, image signal intensity identified as invalid may be rejected or rectified, for example. To generate image signal intensity values for a current frame N, image signal intensity values (e.g., for particular individual color channels) that incorporate a history of image signal intensity values may be accumulated at associated pixel locations.

As may be appreciated, a TAA operation may process a sequence of still frames to produce a desired result by merely accumulating image signal intensity values of a new frame into image signal intensity values from a previous frame. Under motion, however, a TAA operation may reproject (or warp) image signal intensity values of a previous frame to align with image signal intensity values of a current frame. Such a process may be inherently erroneous and introduce artifacts such as, for example, disocclusion and ghosting between pixel values arising from aliasing. In such cases, according to an embodiment, block 106 may execute a series of statistical calculations to promote validity between an image signal intensity value in a previously displayed, reprojected anti-aliased frame and a corresponding image signal intensity value in a current, most recent frame. Operations at block 106 may, for example, act as a gatekeeper to avoid blindly accumulating misaligned and/or invalid image signal intensity values in a sequence of frames.

In one particular implementation, a "hand-written" heuristic driven validation algorithm may be executed with relatively few computing resources. While weighed against image quality consequences of not employing such a heuristic driven algorithm, such a heuristic driven algorithm may be executed across every new image signal intensity value, for every new frame, regardless of the content. However, more computationally intensive validation methods, such as Neural Super Sampling, may derive superior image quality.

Briefly, particular embodiments are directed to selecting one of a plurality of available TAA operations for application to pixels covering a portion of an image in a to be rendered frame comprising the image. Such a selection of an available TAA operation may be based, at least in part, on a corresponding portion in a previously rendered frame. As may be appreciated, a dynamic selection of a TAA operation may enable a bypass of a computationally intensive validation operation applied to specific image patches if such a computationally intensive validation operation would be expected to achieve minimal or no substantial benefit. In particular implementations, techniques described herein may be applied to hardware and/or software implementations, including processor implementations (e.g., graphic processing unit (GPU) and/or neural processing unit (NPU) implementations) that receive high resolution input images that are segmented into patches for effective use of cache and avoidance of DRAM trips.

According to an embodiment, features of system 200 (FIG. 1) may be integrated with an electronic device capable of displaying and/or reproducing visual images such as a device capable of generating signals in a particular format to drive a display device. Such a device may comprise, for example, a mobile phone and/or other specialized computing device applicable for gaming, etc.

Here, a reprojected image generated by block 204 (based, at least in part, on image signal intensity values of a frame N−1) may be partitioned into regions and/or patches at block 212. In particular implementations, such regions and/or patches may be of a uniform size and/or dimension or or of a variable size and/or dimension. According to an embodiment, a size and/or dimension of a region and/or patch to be generated at block 212 may be tuned according to an availability of processing resources and/or system constraints such as, for example, available cache memory, system memory capacity/bandwidth, weigh up memory usage with region/patch size vs. associated redundant compute, just to provide a few examples. As such, particular implementations are directed to selecting a TAA operation among available TAA operations that is least "computationally intensive" in consuming such processing resources. Block 214 may assess a similarity between a region and/or patch extracted from a reprojected image at block 212 and a corresponding portion of an image currently rendered at block 202 to determine whether to apply a more computationally intensive and/or robust validation operation at block 206 or a less computationally intensive and less computationally intensive and/or robust validation operation at block 216.

In a particular implementation, block 214 may compute a similarity metric based, at least in part, on image signal intensity values in a region and/or patch extracted at block 212 and corresponding image signal intensity values in an image currently rendered at block 202. Such a computed metric may then be compared to a threshold to select between application of a validation operation at block 206 and application of a validation operation at block 216. For simplicity of illustration, system 200 of FIG. 1 shows a possible selection between two different validation operations. In other implementations, a metric (e.g., as computed at block 214) may be applied to a multi-threshold test to select from among three or more available validation operations.

FIG. 2 is a flow diagram of a process 300 for selection of a temporal anti-aliasing operation according to an embodiment. In a particular implementation, aspects of process 300 may be performed, at least in part, by one or more features of system 200. Block 302 may comprise obtaining signal values to represent a previous image frame in any one of several formats. For example, such a previous image frame may comprise intensity values for multiple color channels (e.g., image signal intensity values for red, blue and green) associated with pixel locations in an image.

Block 304 may comprise selection of one of plurality of available temporal antialiasing operations for application to image signal intensity values to represent a portion of an image in a current image frame. Such selection of an available antialiasing operation may be based, at least in part, on parameters associated with a previous image frame. In this context, a "temporal antialiasing operation" as referred to herein means one or more computational and/or signal processing operations intended to counteract effects of aliasing in an image. For example, such a temporal antialiasing operation may comprise detection of a presence and/or degree of aliasing present in a reproduced image. Alternatively, such a temporal antialiasing operation may comprise one or more signal processing operations to avoid and/or correct for an aliasing effect in a reproduced image. As pointed out above, temporal antialiasing operations available for selection at block 304 may include a heuristic driven validation operation that may be executed with relatively few computing resources or a more computationally intensive validation operation based on Neural Super Sampling. It should be understood, however, that these are merely examples of a temporal antialiasing operation, and claimed subject matter is not so limited by these specific examples.

In a particular implementation, block 304 may compute a metric based, at least in part, on a comparison of attributes associated with the portion of the image in the current frame (e.g., Frame N, FIG. 1) and attributes associated with a corresponding portion of the previous image frame (e.g., Frame N−1, FIG. 1). An available temporal antialiasing operation based, at least in part, on the computed metric. According to an embodiment, block 304 may compute a metric according to expression (1) as follows:

$$\text{Cost} = |D_t - W(D_{t_{m1}})| \times \sqrt{u^2 + v^2}, \tag{1}$$

where:
D_t is a depth of a current image frame;
$W(D_{t_{m1}})$ is a depth of a previous image frame warped and aligned to the current image frame;
u is a horizontal displacement vector; and
v is a vertical displacement vector.

According to an embodiment, parameters $D_t$, $D_{t_{m1}}$, u and/or v may be obtained from metadata stored in an image frame buffer maintained in a pipeline computing architecture. In one particular implementation, such a frame buffer may comprise a geometry buffer. It may be appreciated that in the formulation of a metric according to expression (1), a motion and/or displacement vector of zero magnitude may correspond to a metric Cost=0, suggesting that either direct accumulation (e.g., application of no validation and/or rectification) or a least computationally intensive antialiasing operation may be applied. Conversely, a patch in a current image frame having a large disparity with a corresponding warped patch in a previous image frame and/or has been affected by significant motion between current and previous image frames may correspond to a lower metric value according to expression (1), suggesting a benefit to applying a more computationally intensive antialiasing operation. In one aspect, the term $|D_t - W(D_{t_{m1}})|$ in expression (1) may be heightened and or increased responsive to a presence of a ghosting effect in an associated patch in a current image frame. Nonetheless, the term $|D_t - W(D_{t_{m1}})|$ may not, in some instances reliably detect a presence of ghosting. As such, an additional term in expression (1) quantifying a magnitude of displacement of a feature between current and previous image frames may be responsive to ghosting if $|D_t - W(D_{t_{m1}})|$ is not responsive to ghosting. It should be understood, however, that expression (1) is merely one example of how a metric may be computed, and that other implementations may compute a metric differently and/or based on other parameters (e.g., other/different parameters obtained from metadata stored in an image frame buffer).

While a metric according to expression (1) is one example of how block 304 may compute a metric based on a comparison of particular computed attributes of current and previous image frames, other metrics may be computed based on different computed attributes of current and previous image frames. For example, block 304 may compute such a metric based, at least in part, on a comparison of a computed surface normal in the current frame and a computed surface normal in the previous frame. In another alternative, block 304 may compute such a metric based, at least in part, on a comparison of a computed shadow map in the current frame and a computed shadow map in the previous frame.

According to an embodiment, a temporal antialiasing operation selected at block 304 may be selected for application to a predefined "patch" such as image signal values associated with a group of contiguous pixels in a current image frame. For example, and as pointed out above, a reprojected image generated by block 204 (based, at least in part, on pixel values of a frame N–1) may be partitioned into patches at block 212 for evaluation and application of an antialiasing operation. In a particular implementation, parameters for computing a metric (such as in expression (1)) may be applied to determining an assessment of a similarity between such a patch in a current image frame and a corresponding patch in a previous image frame.

In a specific implementation, block 304 may select between application of different validation operations such as between validation operations 206 and 216 (FIG. 1). It should be understood, however, that in different implementations block 304 may select between application of different features of available antialiasing operations, and that claimed subject matter is not limited in this respect. Additionally, as indicated above, with respect to FIG. 1, block 304 may apply a threshold to a metric (e.g., as computed according to expression (1)) to select between application of an available temporal antialiasing operation. Furthermore, block 304 may apply a multi-threshold test to select from among three or more available temporal antialiasing operations.

According to an embodiment system 200 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, system 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 3:
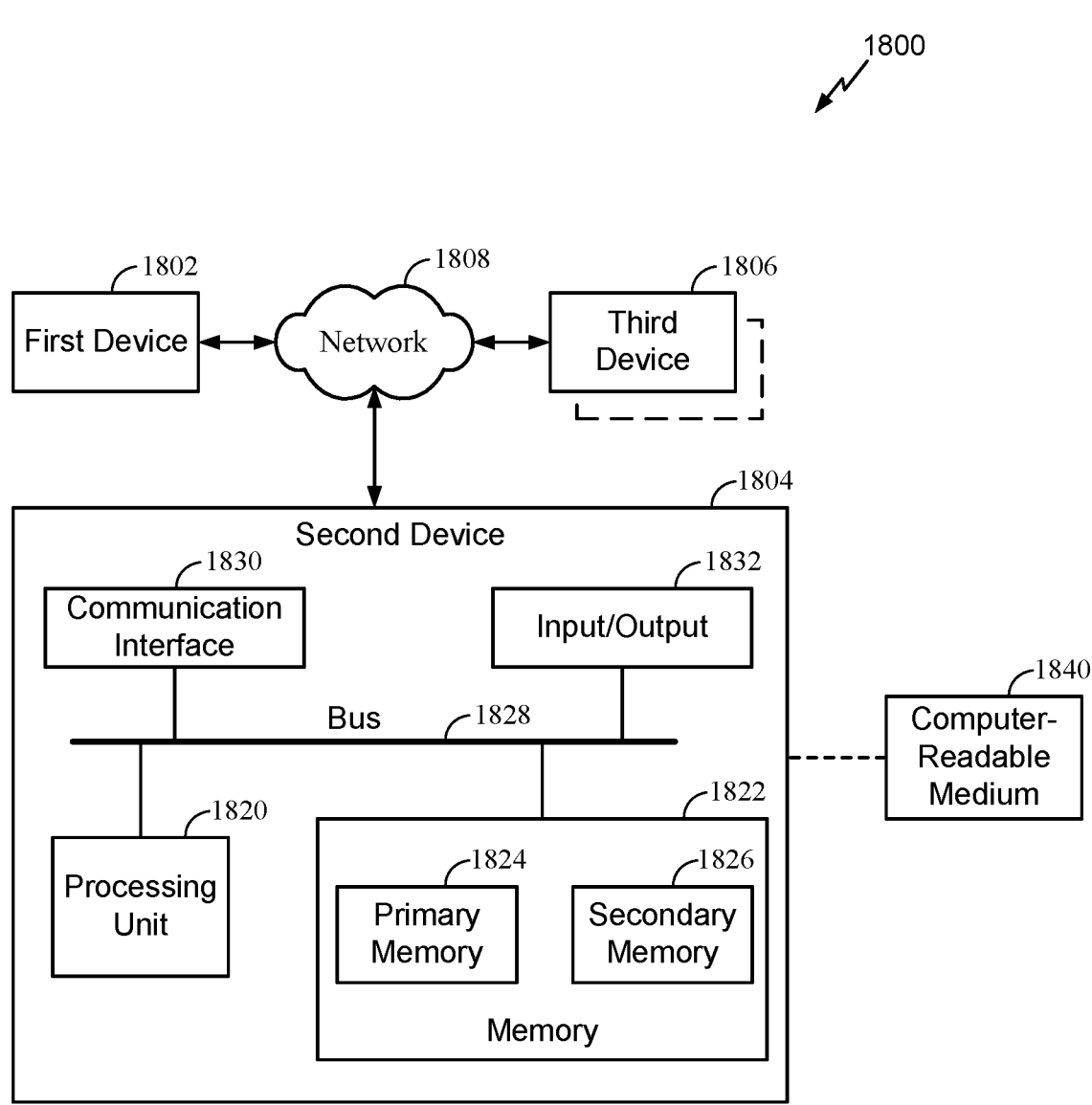
FIG. 3 is a schematic block diagram of an example computing system in accordance with an implementation.

For purposes of illustration, FIG. 3 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 3 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112(f) so that it is specifically intended that 35 USC § 112(f) not be implicated by use of the term "computing device," "processor," "processing unit," "processing circuit" and/or similar terms; however, if it is determined, for some reason not immediately apparent, that the foregoing understanding cannot stand and that 35 USC § 112(f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 through 3 and in the text associated with the foregoing figure(s) of the present patent application.

Referring now to FIG. 3, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 3, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 3, is merely one example, and claimed subject matter is not limited in scope to this particular example. FIG. 3 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 3, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 3 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 3, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 3 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
computing, by one or more processors, for each of a plurality of patches of contiguous pixels into which a previous image frame is partitioned, at least one attribute of the patch of contiguous pixels in the previous image frame;
computing, by the one or more processors, for each of the plurality of patches of contiguous pixels into which the previous image frame is partitioned, at least one attribute of a patch of contiguous pixels in a rendered image corresponding to the patch of contiguous pixels in the previous image frame; and
applying, by the one or more processors, a temporal antialiasing operation for application to image signal intensity values to represent a selected patch of contiguous pixels in a current image frame among a plurality of patches of contiguous pixels into which the current image frame is partitioned, the temporal antialiasing operation being selected for application to the image signal intensity values from among a plurality of temporal antialiasing operations individually selectable for each of the plurality of patches of contiguous pixels into which the current image frame is partitioned based, at least in part, on a comparison of the computed at least one attribute of the patch of contiguous pixels in the previous image frame and the computed at least one attribute of the patch of contiguous pixels in the rendered image, the comparison indicating a degree of aliasing present in the patch of contiguous pixels in a reproduced image, wherein:
different temporal antialiasing operations are selected for application to image signal intensity values of different patches of contiguous pixels into which the current image frame is partitioned based, at least in part, on the comparison indicating the degree of aliasing present in the patch of contiguous pixels in the reproduced image.

2. The method of claim 1, and further comprising:
determining a metric based, at least in part, on the comparison; and
selecting the one of the plurality of temporal antialiasing operations individually selectable for each of the plurality of patches of contiguous pixels into which the current image frame is partitioned based, at least in part, on the metric.

3. The method of claim 2, wherein the plurality of temporal antialiasing operations comprise at least a first temporal antialiasing operation and a second temporal antialiasing operation, and further comprising selecting the first temporal antialiasing operation responsive to the metric indicating greater than a threshold level of similarity.

4. The method of claim 3, wherein the second temporal antialiasing operation being more computationally intensive than the first temporal antialiasing operation.

5. The method of claim 2, and further comprising computing the metric based, at least in part, on a difference between a frame depth of the rendered image and a frame depth of a warped previous image frame.

6. The method of claim 2, and further comprising computing the metric based, at least in part, on a magnitude of a displacement vector indicative of a displacement between a position in the previous image frame and a corresponding position in the rendered image.

7. The method of claim 2, and further comprising computing the metric based, at least in part, on a comparison of a computed surface normal in the rendered image and a computed surface normal in the previous image frame.

8. The method of claim 2, and further comprising computing the metric based, at least in part, on a comparison of a computed shadow map in the rendered image and a computed shadow map in the previous image frame.

9. The method of claim 2, and further comprising:
retrieving the at least one attribute of the rendered image from a frame buffer location associated with the rendered image; and
retrieving the at least one attribute of the previous image frame from a frame buffer location associated with the previous image frame.

10. The method of claim 9, wherein the frame buffer location associated with the rendered image and the frame buffer location associated with the previous image frame are located in a geometry buffer.

11. An electronic device comprising:
circuitry to, for each of a plurality of patches of contiguous pixels into which a previous image frame is partitioned, compute at least one attribute of the patch of contiguous pixels in the previous image frame;

circuitry to compute, for each of the plurality of patches into which the previous image frame is partitioned, at least one attribute of a patch of contiguous pixels in a rendered image corresponding to the patch of contiguous pixels in the previous image frame; and circuitry to execute a temporal antialiasing operation for application to image signal intensity values to represent a selected patch of contiguous pixels in a current image frame among a plurality of patches of contiguous pixels into which the current image frame is partitioned, the temporal antialiasing operation to be selected for application to the image signal intensity values from among a plurality of temporal antialiasing operations individually selectable for each of the plurality of patches of contiguous pixels into which the current image frame is partitioned to be based, at least in part, on a comparison of the at least one computed attribute of the patch of contiguous pixels in the previous image frame and the at least one computed attribute of the patch of contiguous pixels in the rendered image, the comparison indicating a degree of aliasing present in the patch of contiguous pixels in a reproduced image, wherein:

different temporal antialiasing operations are selected for application to image signal intensity values of different patches of contiguous pixels into which the current image frame is partitioned based, at least in part, on the indicating of the degree of aliasing present in the patch of contiguous pixels in the reproduced image.

12. An apparatus comprising:

one or more storage devices; and one or more processors coupled to the one or more storage devices to:

compute, for each of a plurality of patches of contiguous pixels into which a previous image frame is partitioned, at least one attribute of the patch in the previous image frame based, at least in part, on image signal intensity values of the patch of contiguous pixels in the previous image frame;

compute, for each of the plurality of patches into which the previous image frame is partitioned, at least one attribute of a patch of a rendered image corresponding to the patch of contiguous pixels in the previous image frame; and apply a temporal antialiasing operation to image signal intensity values to represent a selected patch of contiguous pixels among a plurality of patches into which a current image frame is partitioned, the temporal antialiasing operation to be selected for application to the image signal intensity values to represent the selected patch of contiguous pixels among the plurality of patches in the current image frame from among a plurality of temporal antialiasing operations individually selectable for each of the plurality of patches of contiguous pixels into which the current image frame is partitioned based, at least in part, on a comparison of the at least one computed attribute of the patch of contiguous pixels in the previous image frame and the at least one computed attribute of the patch of contiguous pixels in the rendered image, the comparison indicating a degree of aliasing present in the patch of contiguous pixels in a reproduced image, wherein:

different temporal antialiasing operations are selected for application to image signal intensity values of different patches of contiguous pixels into which the current image frame is partitioned based, at least in part, on the comparison indicating the degree of aliasing present in the patch of contiguous pixels in the reproduced image.

13. The apparatus claim 12, wherein the one or more processors are further to:

obtain a metric based, at least in part, on the comparison; and select the one of the plurality of temporal antialiasing operations individually selectable for each of the plurality of patches of contiguous pixels into which the current image frame is partitioned based, at least in part, on the metric.

14. The apparatus of claim 13, wherein the plurality of temporal antialiasing operations individually selectable for each of the plurality of contiguous pixels into which the current image frame is partitioned comprises at least a first temporal antialiasing operation and a second temporal antialiasing operation, and wherein the one or more processors are further to select the first temporal antialiasing operation responsive to an indication by the metric of a similarity greater than a threshold level of similarity.

15. The apparatus of claim 14, wherein the second temporal antialiasing operation being more computationally intensive than the first temporal antialiasing operation.

16. The apparatus of claim 13, and wherein the one or more processors are to compute the metric based, at least in part, on a difference between a frame depth of the rendered image and a frame depth of a previous warped image frame.

17. The apparatus of claim 13, and wherein the one or more processors are further to compute the metric based, at least in part, on a magnitude of a displacement vector indicative of a displacement between a position in the previous image frame and a corresponding position in the rendered image.

18. The apparatus of claim 13, wherein the one or more processors are further comprising computing the metric based, at least in part, on a comparison of a computed surface normal in the rendered image and a computed surface normal in the previous image frame.

19. The apparatus of claim 13, and wherein the one or more processors are further to compute the metric based, at least in part, on a comparison of a computed shadow map in the rendered image and a computed shadow map in the previous image frame.

20. The apparatus of claim 13, and wherein the one or more processors are further to:

retrieve the at least one computed attribute of the rendered image from a frame buffer location formed in the one or more storage devices associated with the rendered image; and retrieve the at least one computed attribute of the previous image frame from a frame buffer location formed in the one or more storage devices associated with the previous image frame.

21. The apparatus of claim 13, wherein the one or more processors are further to:

apply the selected one of the temporal antialiasing operations individually selectable for each of the plurality of patches of contiguous pixels into which the current image frame is partitioned to accept or reject the image signal intensity values to represent the selected patch of contiguous pixels in the current image frame.

* * * * *